United States Patent
Newhouse

(10) Patent No.: US 10,288,223 B2
(45) Date of Patent: May 14, 2019

(54) FAILURE INDICATOR SUPPLEMENTAL VESSEL FOR PRIMARY VESSEL

(71) Applicant: Hexagon Technology AS, Alesund (NO)

(72) Inventor: Norman L. Newhouse, Lincoln, NE (US)

(73) Assignee: Hexagon Technology AS, Alesund (NO)

(*) Notice: Subject to any disclaimer, the term of this patent is extended or adjusted under 35 U.S.C. 154(b) by 18 days.

(21) Appl. No.: 15/345,883

(22) Filed: Nov. 8, 2016

(65) Prior Publication Data

US 2017/0146192 A1 May 25, 2017

Related U.S. Application Data

(60) Provisional application No. 62/257,809, filed on Nov. 20, 2015.

(51) Int. Cl.
| | |
|---|---|
| *F17C 5/06* | (2006.01) |
| *G01M 3/32* | (2006.01) |
| *F17C 13/02* | (2006.01) |

(52) U.S. Cl.
CPC .............. *F17C 5/06* (2013.01); *F17C 13/02* (2013.01); *G01M 3/3209* (2013.01);
(Continued)

(58) Field of Classification Search
CPC .............. F17C 13/02; F17C 2203/069; F17C 2203/0631; F17C 2250/01;
(Continued)

(56) References Cited

U.S. PATENT DOCUMENTS

| | | | |
|---|---|---|---|
| 1,962,168 A | 6/1934 | Andrus | |
| 3,381,523 A | 5/1968 | Nettles | |

(Continued)

FOREIGN PATENT DOCUMENTS

| | | |
|---|---|---|
| EP | 3067614 A1 | 9/2016 |
| WO | 2014086419 A1 | 6/2014 |
| WO | 2015004344 A2 | 1/2015 |

OTHER PUBLICATIONS

International Search Report and Written Opinion dated Mar. 20, 2017 for international application No. PCT/US2016/062015.

*Primary Examiner* — Mary E McManmon
*Assistant Examiner* — Nicole Gardner
(74) *Attorney, Agent, or Firm* — Mai-Tram D. Lauer; Westman, Champlin & Koehler, P.A.

(57) ABSTRACT

A system includes a source of pressurized fluid, a primary pressure vessel disposed in fluid communication with the source, and a supplemental pressure vessel disposed in fluid communication with the source and in fluid communication with the primary pressure vessel. The primary pressure vessel has a first life expectancy duration and includes a first structural characteristic. The supplemental pressure vessel has a second life expectancy duration shorter than the first life expectancy duration and includes a second structural characteristic. A method uses a supplemental pressure vessel to predict impending failure of a primary pressure vessel. The method includes connecting a primary pressure vessel to a source of pressurized fluid, fluidly connecting a supplemental pressure vessel with the source and with the primary pressure vessel, and exposing the supplemental pressure vessel to a first fatigue load to cause its failure before failure of the primary pressure vessel occurs.

16 Claims, 4 Drawing Sheets

(52) U.S. Cl.
CPC ........... *F17C 2203/0636* (2013.01); *F17C 2203/0663* (2013.01); *F17C 2203/0673* (2013.01); *F17C 2205/0134* (2013.01); *F17C 2250/032* (2013.01); *F17C 2250/043* (2013.01); *F17C 2250/0439* (2013.01); *F17C 2250/0465* (2013.01); *F17C 2250/0469* (2013.01); *F17C 2250/0689* (2013.01)

(58) Field of Classification Search
CPC ........ F17C 2250/0473; F17C 2260/042; F17C 5/06; Y10T 137/86196; G05B 23/0283
See application file for complete search history.

(56) References Cited

U.S. PATENT DOCUMENTS

| | | | |
|---|---|---|---|
| 3,848,765 A | 11/1974 | Dürkop | |
| 4,369,894 A | 1/1983 | Grover et al. | |
| 4,453,399 A | 6/1984 | Thompson | |
| 4,487,226 A | 12/1984 | Chun | |
| 4,524,608 A | 6/1985 | Bellefeuille et al. | |
| 4,696,186 A | 9/1987 | Sharp | |
| 4,796,676 A | 1/1989 | Hendershot et al. | |
| 4,838,971 A | 6/1989 | Cacak | |
| 5,072,623 A | 12/1991 | Hendershot | |
| 5,081,864 A | 1/1992 | Zaim | |
| 5,668,534 A | 9/1997 | Haboian et al. | |
| 6,158,605 A * | 12/2000 | DeLay | B29C 53/602 220/62.17 |
| 6,489,894 B2 | 12/2002 | Berg | |
| 6,543,294 B2 | 4/2003 | Stamps et al. | |
| 7,131,335 B2 | 11/2006 | Textor | |
| 7,788,967 B2 | 9/2010 | Golding et al. | |
| 8,117,900 B2 | 2/2012 | Russell | |
| 8,602,065 B2 | 12/2013 | Aulanko et al. | |
| 8,671,768 B2 * | 3/2014 | Kanezaki | F17C 13/02 73/720 |
| 2006/0088948 A1 | 4/2006 | McManus | |
| 2011/0210857 A1 | 9/2011 | Berg et al. | |
| 2016/0169449 A1 | 6/2016 | Allidieres | |

* cited by examiner

FAILURE INDICATOR SUPPLEMENTAL VESSEL FOR PRIMARY VESSEL

CROSS REFERENCE TO RELATED APPLICATION

This application claims the benefit of priority from U.S. Provisional Patent Application Ser. No. 62/257,809, filed Nov. 20, 2015, which is fully incorporated herein by reference.

BACKGROUND

Pressure vessels are commonly used for containing a variety of gasses or fluids under pressure, such as hydrogen, oxygen, natural gas, nitrogen, propane and other fuels, for example. Generally, pressure vessels can be of any size or configuration. The vessels can be heavy or light, single-use (e.g., disposable), reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites, which may be formed of laminated layers of wound fiberglass filaments or other synthetic filaments bonded together by a thermo-setting or thermoplastic resin. A liner or bladder is often disposed within a pressure vessel shell to seal the vessel, thereby serving as a fluid permeation barrier.

Generally, pressure vessels have limited lifetimes, and it is desirable to remove a pressure vessel from service before it fails, as failures can be catastrophic and cause damage or injury. Both cyclic fatigue and static fatigue (stress rupture) contribute to the fatigue load, and thus the failure, of pressure vessels. The calendar life of a pressure vessel, or the number of fatigue cycles over a specific pressure range (for example, from near empty to full), is commonly used to determine when to remove a vessel from service. However, in some applications, the pressure ranges and number of cycles applied to the pressure vessel are inconsistent and/or unknown. In addition, the interaction between cyclic fatigue life and static fatigue life is not well understood. The effects of cycling combine in unknown ways with the effects of the duration the pressure vessel spends at full pressure without cycling.

Mathematical projections of vessel lifetime are commonly used to evaluate the fatigue life of a pressure vessel. This requires that the number of cycles be counted or estimated, then sorted by mean stress levels and stress range. These cycles are combined into an equivalent number of full-range cycles to estimate the remaining vessel life. It must then be determined how to combine this information with static fatigue. Uncertainties are inherent in the calculation and estimation of cycles, in combining cycle effects, and in assessing the projected total and remaining life of the pressure vessel.

SUMMARY

In one aspect, this disclosure describes a system comprising a source of pressurized fluid, a primary pressure vessel disposed in fluid communication with the source, and a supplemental pressure vessel disposed in fluid communication with the source and in fluid communication with the primary pressure vessel. The primary pressure vessel has a first life expectancy duration and comprises a first structural characteristic. The supplemental pressure vessel has a second life expectancy duration shorter than the first life expectancy duration and comprises a second structural characteristic.

In another aspect, this disclosure describes a method that uses a supplemental pressure vessel to predict impending failure of a primary pressure vessel. The method comprises fluidly connecting a primary pressure vessel to a source of pressurized fluid, fluidly connecting a supplemental pressure vessel in fluid communication with the source and in fluid communication with the primary pressure vessel, and exposing the supplemental pressure vessel to a first fatigue load to cause its failure before failure of the primary pressure vessel occurs.

This disclosure, in its various combinations, either in apparatus or method form, may also be characterized by the following listing of items:

1. A system comprising:
   a source of pressurized fluid;
   a primary pressure vessel disposed in fluid communication with the source, the primary pressure vessel having a first life expectancy duration and comprising a first structural characteristic; and
   a supplemental pressure vessel disposed in fluid communication with the source and in fluid communication with the primary pressure vessel, the supplemental pressure vessel having a second life expectancy duration shorter than the first life expectancy duration and comprising a second structural characteristic.
2. The system of item 1 wherein the supplemental pressure vessel is smaller than the primary pressure vessel.
3. The system of any of items 1-2 wherein the second structural characteristic is a weakness configured such that the supplemental pressure vessel fails at the weakness.
4. The system of any of items 1-3 wherein:
   the first structural characteristic is a first material; and
   the second structural characteristic is a second material that is different from the first material.
5. The system of item 4 wherein:
   the first material is a carbon fiber composite; and
   the second material is an aramid fiber composite.
6. The system of any of items 1-5 wherein the supplemental pressure vessel is disposed in parallel with primary pressure vessel with respect to the source.
7. The system of any of items 1-6 wherein the supplemental pressure vessel is disposed in series between the source and primary pressure vessel.
8. The system of any of items 1-7, and further comprising a containment structure configured to at least partially enclose the supplemental pressure vessel in an interior space therein.
9. The system of item 8, and further comprising a sensor configured to detect a physical condition of the interior space that indicates failure of the supplemental pressure vessel.
10. The system of item 9, and further comprising a controller in signal communication with the sensor.
11. The system of item 10, and further comprising an indicator device in signal communication with the controller.
12. The system of any of items 10-11 further comprising a valve disposed between the source and the primary pressure vessel, the valve being in signal communication with the controller.
13. A method that uses a supplemental pressure vessel to predict impending failure of a primary pressure vessel, the method comprising:
   fluidly connecting a primary pressure vessel to a source of pressurized fluid;

fluidly connecting a supplemental pressure vessel in fluid communication with the source and in fluid communication with the primary pressure vessel; and
exposing the supplemental pressure vessel to a first fatigue load to cause its failure before failure of the primary pressure vessel occurs.

14. The method of item 13, and further comprising:
at least partially enclosing the supplemental pressure vessel in an interior space of a containment structure; and
sensing a value of a physical condition of the interior space.

15. The method of item 14, and further comprising:
communicating the sensed value to a controller; and
determining whether the failure of the supplemental pressure vessel has occurred as a function of the sensed value.

16. The method of item 15, and further comprising relaying a signal from the controller to an indicator device to actuate the indicator device, thereby signaling the failure of the supplemental pressure vessel to a user.

17. The method of any of items 15-16, and further comprising relaying a signal from the controller to a valve to stop fluid flow from the source to the primary pressure vessel.

18. The method of any of items 13-17, further comprising exposing the primary pressure vessel to a second fatigue load that is lower than the first fatigue load.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

This disclosure recognizes that it is desirable to anticipate vessel failure, allowing preemptive removal of a vessel from service before it fails. In an exemplary embodiment, a supplemental pressure vessel is used to determine when a primary pressure vessel is approaching the end of its usable life. Accordingly, the disclosed systems and methods allow a user to predict impending failure of the primary pressure vessel. In an exemplary embodiment, the supplemental pressure vessel serves as a failure indicator that is specific to the structural and material characteristics of the primary pressure vessel. In an exemplary embodiment, the supplemental pressure vessel is designed to fail at a predetermined percentage of a primary pressure vessel's anticipated lifetime.

Figure 1:
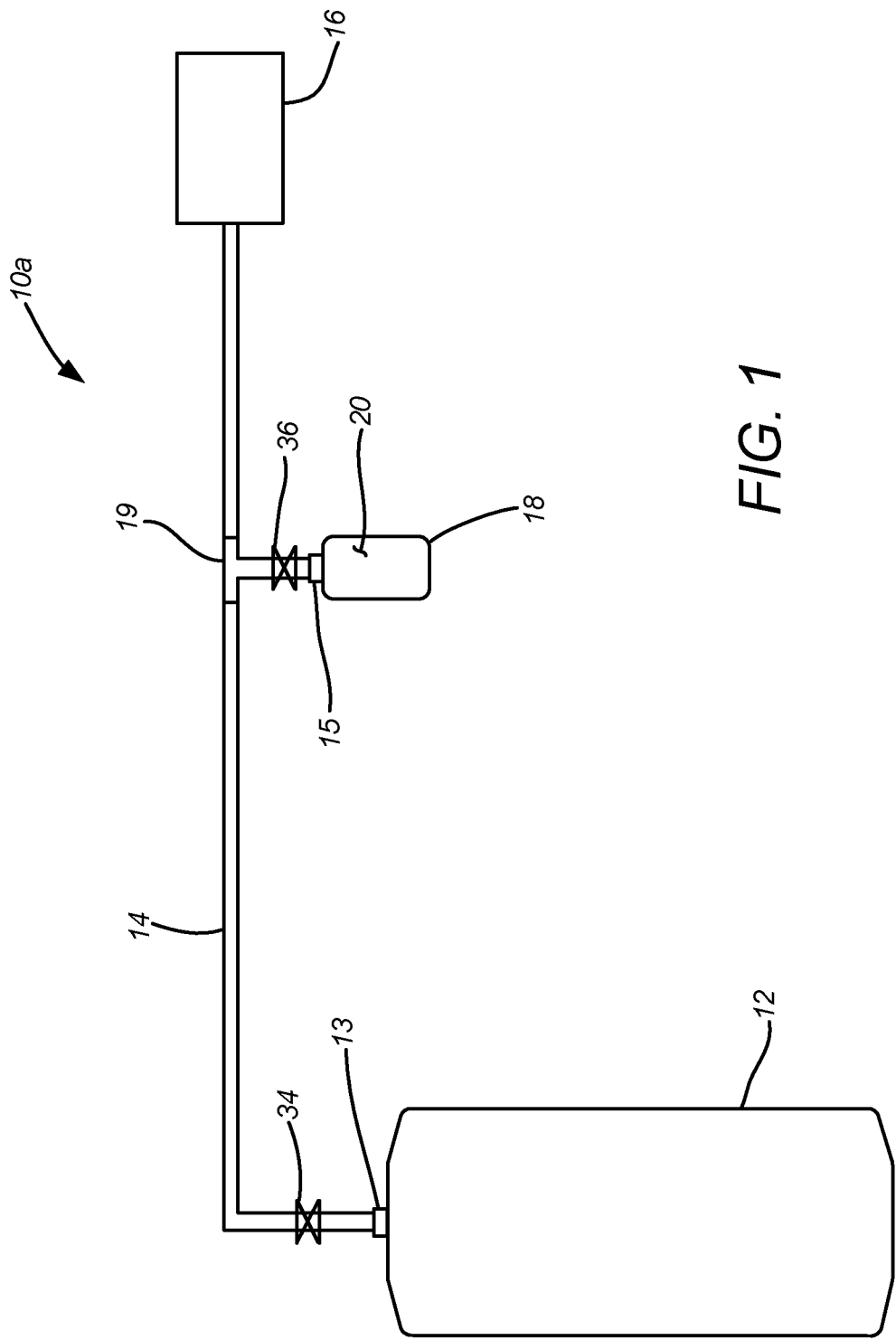
FIG. 1 shows a schematic view of an exemplary system including a pressure vessel and a supplemental indicator pressure vessel coupled in parallel to a fluid source with a "tee" connector.

FIG. 1 shows a schematic illustration of an exemplary embodiment of a pressure vessel failure indicator system 10a, which includes primary pressure vessel 12 coupled (e.g., in fluid communication) to source line 14. Source line 14 may be, for example, metallic and/or polymer conduit or tubing. Pressure vessel 12 is configured to contain a liquid or gaseous fluid under pressure and include metallic, polymeric, and/or composite construction. Suitable metals include, for example, stainless steel and nickel alloys. Suitable composite materials include, for example, fiberglass or carbon fiber. Source line 14 allows fluidic communication of pressure vessel 12 with a source of pressurized fluid 16, which provides the fluid with which pressure vessel 12 is filled. In the illustrated embodiment, the supplemental pressure vessel 18 is disposed in parallel with primary pressure vessel 12 with respect to the source 16. Typically, pressure vessel 12 is coupled to line 14 via boss 13 of pressure vessel 12, but any coupling mechanism that allows fluid in line 14 to flow into and out of pressure vessel 12 may be used.

In the illustrated embodiment, a supplemental pressure vessel 18 is coupled to fluid source 16 through source line 14. Supplemental pressure vessel 18 may be coupled to line 14 via a boss 15 of supplemental pressure vessel, or by any other useful coupling mechanism. The supplemental pressure vessel 18 is designed such that, when subjected to substantially the same operating conditions as primary pressure vessel 12, supplemental pressure vessel 18 fails before pressure vessel 12. In an exemplary embodiment of system 10, supplemental pressure vessel 18 may be designed to have a predetermined time-to-failure (e.g., life expectancy duration) that is less than the expected time-to-failure of pressure vessel 12 by an amount that allows failure of the supplemental pressure vessel 18 to signal an impending failure of pressure vessel 12. For example, supplemental pressure vessel 18 may have thinner or weaker walls or be made of different materials (in a particular area or overall, for example) than primary pressure vessel 12. In one example, supplemental pressure vessel 18 is exposed to a fatigue load to cause its failure while primary pressure vessel 12 is designed to withstand a higher fatigue load before failing. Such a fatigue load may be defined by a number of pressure cycles and/or a time duration at one or more static pressures, for example, before structural integrity of supplemental pressure vessel 18 is compromised enough to cause failure.

In an exemplary embodiment, supplemental pressure vessel 18 is designed as a pressure vessel of composite, polymeric and/or metallic construction, similar to primary pressure vessel 12. By using a supplemental vessel 18 of similar materials and construction as the primary working pressure vessel 12, similar lifetimes can be expected. In some cases, the materials and/or construction of supplemental pressure vessel 18 substantially match those of the primary working pressure vessel 12; however, the supplemental vessel 18 is subjected to a higher stress level than the primary pressure vessel 12, which causes the supplemental vessel 18 to fail before the working or primary vessel 12. For example, primary vessel 12 may be wrapped with a first amount of resin-reinforced composite fiber, while supplemental vessel 18 is wrapped with a second amount of resin-reinforced composite fiber that is effectively less than the first amount, taking into consideration factors such as the relative sizes of the primary vessel 12 and the supplemental vessel 18. Because the primary vessel 12 and supplemental vessel are subjected to the same load, the stress upon the supplemental vessel 18 will be higher than the stress experienced by the primary vessel 12 due to the differences in shell construction.

It is contemplated that other differences in material and/or construction (e.g., a structural characteristic) of supplemental pressure vessel 18 compared to that of the primary pressure vessel 12 can be used, so that a life expectancy of the supplemental pressure vessel 18 is shorter than that of the primary pressure vessel 12 under the same operating conditions. In these cases, supplemental pressure vessel 18 is designed to fail before primary pressure vessel 12, even when supplemental pressure vessel 18 is subjected to the same fatigue load compared to primary pressure vessel 12. For example, supplemental pressure vessel 18 and primary pressure vessel 12 may be constructed of different materials, wherein the material of supplemental pressure vessel 18 is more susceptible to fatigue failure. In one example, pressure vessel 12 comprises a carbon fiber composite, and supplemental pressure vessel 18 comprises an aramid fiber composite.

In another example, supplemental pressure vessel 18 may include at least one weakness 20, such as a notch or divot, where mechanical failure may initiate before occurring at another location on supplemental pressure vessel 18. It is contemplated that any weakness 20 may be employed, such as, for example, an area of pressure vessel 18 having a different thickness, composition, structure, susceptibility to corrosion, or other property, rendering the weakness more susceptible to failure than a remainder of supplemental pressure vessel 18. Thus, weakness 20 is configured such that the supplemental pressure vessel 18 fails at weakness 20.

Typically, the supplemental pressure vessel 18 is smaller than the working or primary pressure vessel 12. In exemplary embodiments of system 10, supplemental pressure vessel 18 is configured to contain a smaller volume of fluid than primary pressure vessel 12. This sizing results in cost savings and ease of placement of supplemental pressure vessel 18 in system 10. Details relevant to the formation of an exemplary primary pressure vessel 12 and supplemental pressure vessel 18 are disclosed in U.S. Pat. No. 4,838,971, entitled "Filament Winding Process and Apparatus;" and U.S. Pat. No. 4,369,894, entitled "Filament Wound Vessels;" which are incorporated herein by reference.

Figure 2:
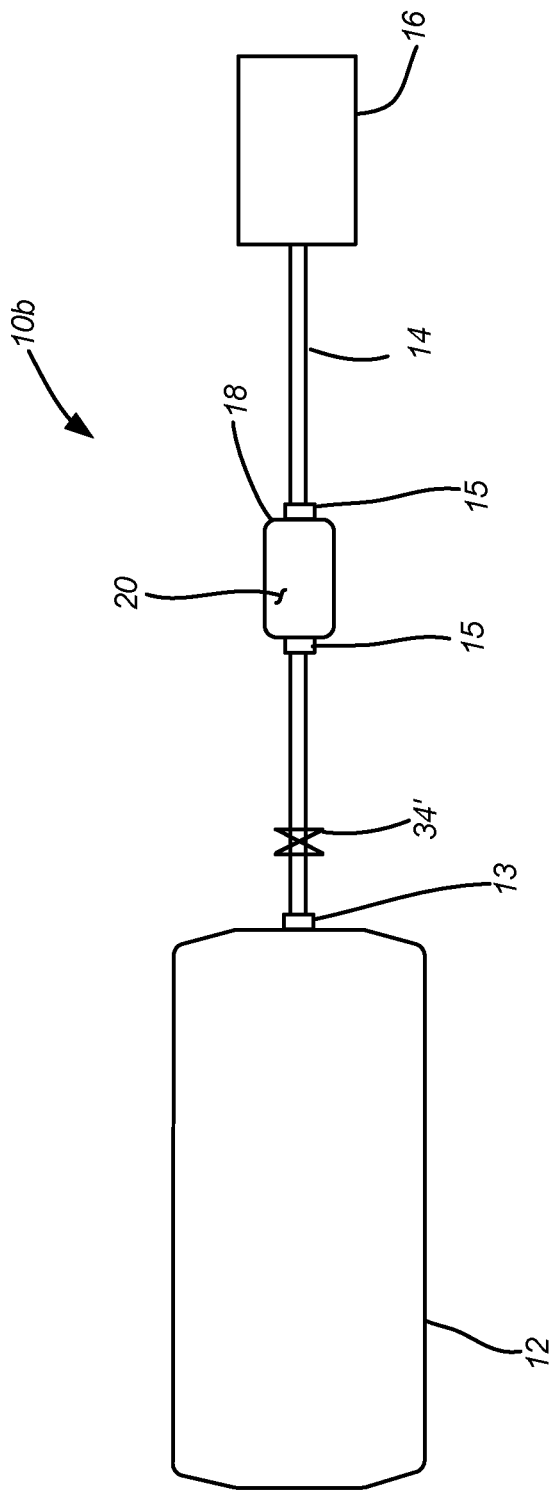
FIG. 2 shows a schematic view of an exemplary system including a pressure vessel coupled in-line (e.g., in series) with a supplemental vessel to a fluid source.

In an exemplary embodiment of system 10, supplemental pressure vessel 18 may be coupled in parallel to source line 14 on a "tee" connector 19 to be in fluid communication with primary pressure vessel 12 and fluid source 16. Alternatively, as shown in system 10b of FIG. 2, supplemental pressure vessel 18 may be coupled to source line 14 such that it is "in-line" with the flow of pressurized fluid from fluid source 16 into or out of pressure vessel 12 (so that the supplemental pressure vessel 18 and the primary pressure vessel 12 are aligned in series). In this embodiment, fluid flows through the supplemental vessel 18 into or out of pressure vessel 12. It is contemplated that supplemental vessel 18, pressure vessel 12, and fluid source 16 may be coupled in any configuration in which supplemental vessel 18 is exposed to substantially the same operating conditions as pressure vessel 12.

Figure 3:
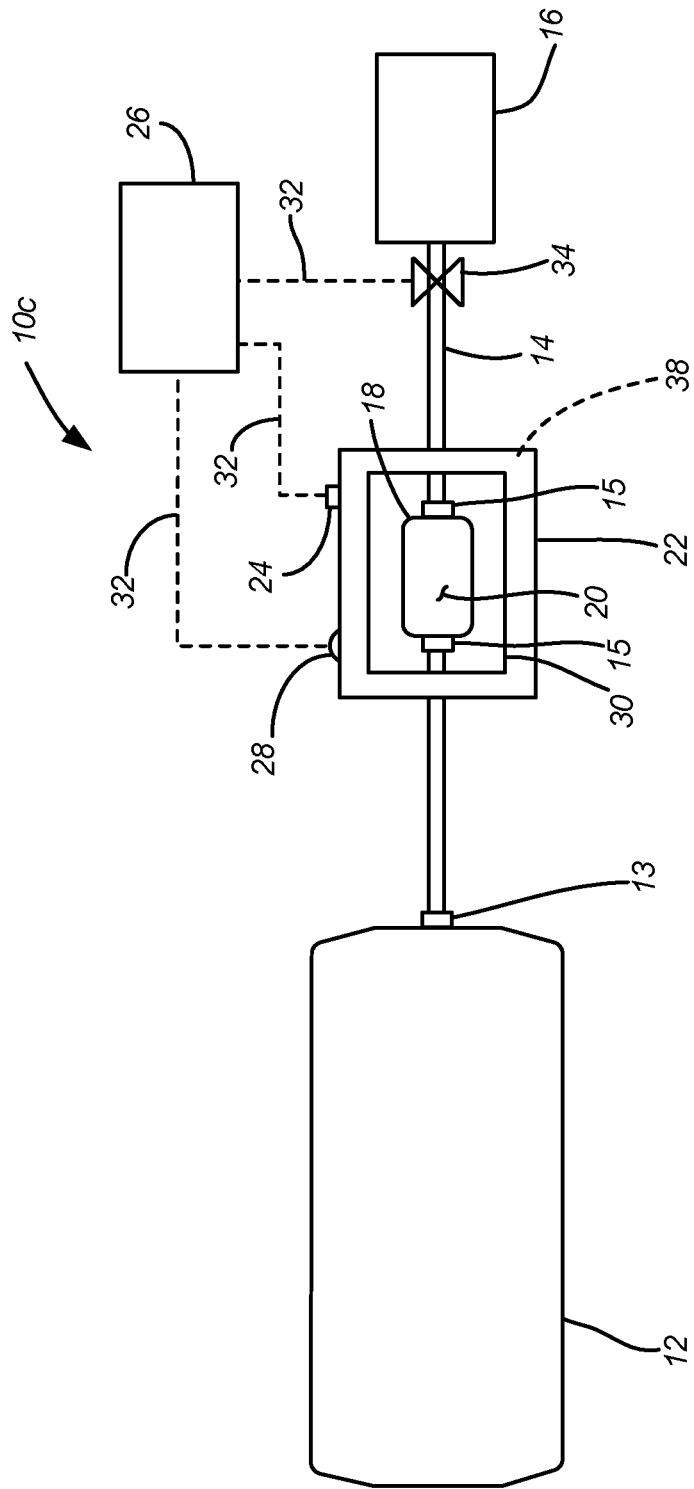
FIG. 3 shows a schematic view of an exemplary system including a pressure vessel coupled in-line (e.g., in series) with a supplemental vessel that is surrounded by a containment structure in communication with sensors and a controller.

In another exemplary embodiment of system 10c shown in FIG. 3, supplemental pressure vessel 18 is enclosed in an interior space 38 of a containment structure 22. Upon failure of supplemental pressure vessel 18, any resulting debris and escaped fluid is captured in interior space 38 of containment structure 22. Containment structure 22 may include a window 30 or other transparent portion through which visual inspection of supplemental pressure vessel 18 may be conducted. Sensor(s) 24 may be mounted in or on containment structure 22 and be configured to detect condition(s) in the interior space 38 of containment structure 22. Sensors 24 may be configured to detect physical conditions (and changes thereof) in interior space 38, such as temperature, pressure, acoustic emissions, or conductivity, for example, or any other indicator of failure of supplemental pressure vessel 18. Sensors 24 may be connected to controller 26 via signal communication line 32.

For ease of discussion, reference will be made to computer controller 26, which can include known processors, microprocessors, microcontrollers, and programmable logic controllers (PLC), for example. Controller 26 runs software and thereby communicates with external devices, such as sensor(s) 24, indicator 28, valve 34 and any other external devices, via signal communication lines 32. In an exemplary embodiment, such signal communication can be performed via interfaces (not shown), such as one using a standard RS-485/Modbus protocol, using hard wired and/or wireless communication means.

Controller 26 receives a signal from a sensor 24 regarding a sensed value of a physical condition and runs software (not shown) to determine whether failure of the supplemental pressure vessel 18 has occurred, as a function of the sensed value. In an exemplary embodiment, controller 26 is configured to respond to a failure of supplemental pressure vessel 18, for example, by triggering indicator 28 and/or removing primary pressure vessel 12 from service. In one example, triggering indicator 28 includes sending a signal from controller 26 to actuate a visible and/or audible signal or alai in to users of the failure of supplemental pressure vessel 18. In another example, removing primary pressure vessel 12 from service includes disconnecting primary pressure vessel 12 from fluid source 16, such as by sending a signal from controller 26 to close valve 34 between primary pressure vessel 12 and fluid source 16, thereby stopping fluid flow from fluid source 16 to primary pressure vessel 12.

In addition or alternatively, supplemental pressure vessel 18 may be dismounted or otherwise removed from service, either before or after failure, for inspection. In system 10a of FIG. 1, removal of supplemental pressure vessel 18 from service may be accomplished by closing valve 36, for example. In this way, the state of primary pressure vessel 12 may be determined from an inspection (including separate testing in some embodiments) of supplemental pressure vessel 18 without interrupting operation of primary of pressure vessel 12. It should be noted that in a case where operation of the primary pressure vessel 12 continues after removal of supplemental pressure vessel 18 from the system 10a, the operator should understand that primary pressure vessel 12 is then subjected to additional stresses not experienced by supplemental pressure vessel 18 during the period when supplemental pressure vessel 18 is not in service.

In an exemplary embodiment, "failure" of supplemental pressure vessel 18 includes rupture thereof or a smaller breach that results in fluid leakage therefrom of a larger than threshold amount. Such a threshold amount may be set by a user and/or determined by software run by controller 26 that takes into account factors including, for example, the sensed physical conditions whose values are determined by sensors 24. For example, if the pressurized fluid in system 10 is a cryogenic fluid, controller 26 may determine that failure of supplemental pressure vessel 18 has occurred if sensor 24 returns a temperature value of the interior space 38 of containment structure 22 that is below a pre-determined threshold temperature. An another example, if the pressurized fluid in system 10 is hydrogen, controller 26 may determine that failure of supplemental pressure vessel 18 has occurred if sensor 24 returns a concentration value of hydrogen in the interior space 38 of containment structure 22 that is above a pre-determined threshold hydrogen concentration. In yet another example, controller 26 may determine that failure of supplemental pressure vessel 18 has occurred if sensor 24 returns a pressure value of gas in the interior space 38 of containment structure 22 that is above a pre-determined threshold pressure. Software run by controller 26 may also be programmed to take into consideration any combination of physical condition values returned by sensors 24 to determine whether failure of supplemental pressure vessel 18 has occurred.

Figure 4:
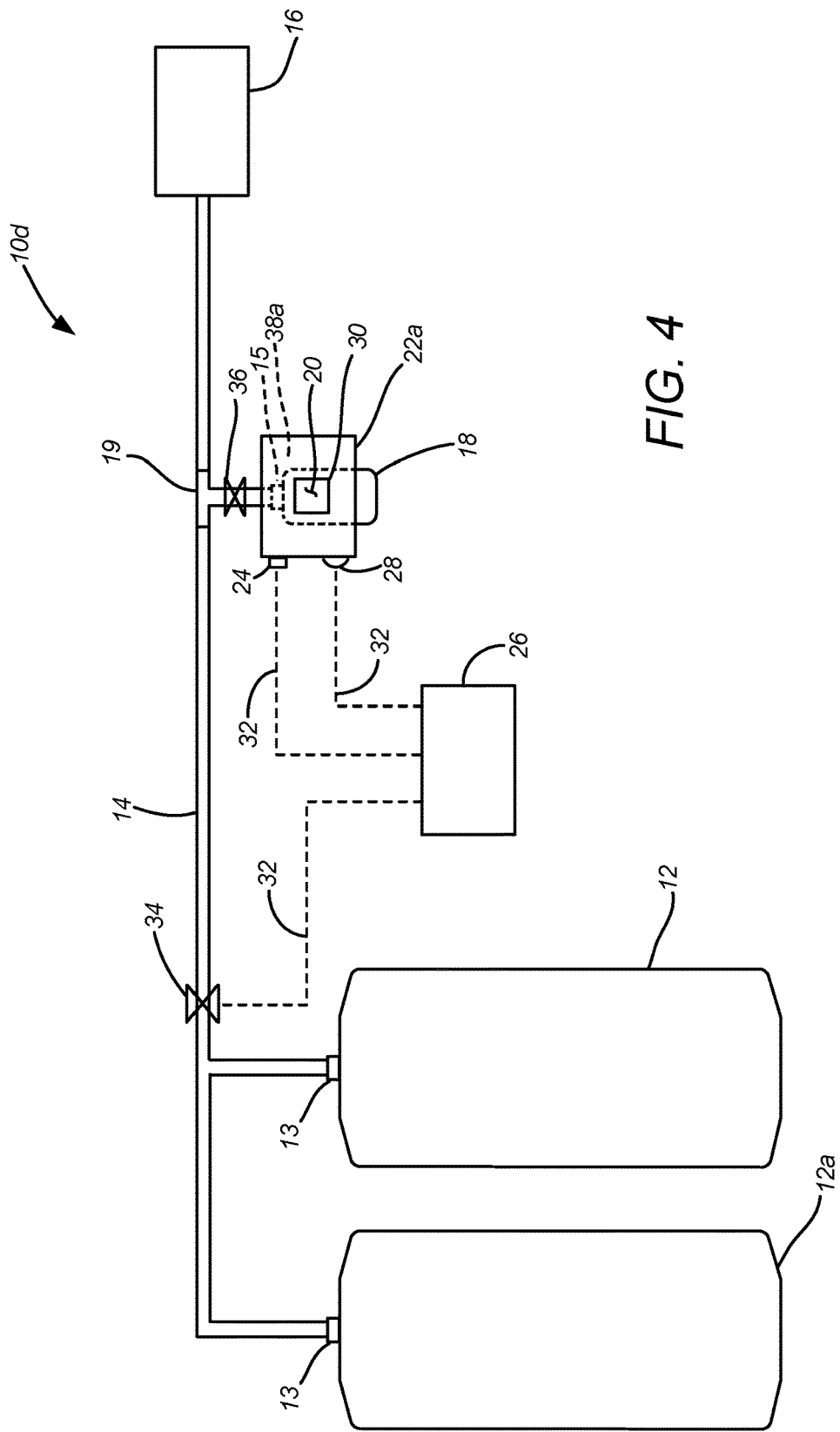
FIG. 4 shows a schematic view of an exemplary system including multiple pressure vessels and a supplemental indicator vessel coupled in parallel to a fluid source with a "tee" connector, with the supplemental vessel at least partially surrounded by a containment structure.

FIG. 4 shows a schematic view of an exemplary system 10d including multiple pressure vessels 12, 12a and a supplemental indicator vessel 18 coupled to a fluid source with a "tee" connector 19 (so that the supplemental pressure vessel 18 and the plurality of primary pressure vessels 12, 12a are aligned in parallel). In the illustrated embodiment, supplemental pressure vessel 18 is at least partially surrounded by a containment structure 22a having an interior space 38a. While containment structure 22a does not fully enclose supplemental pressure vessel, the weakness 20 of supplemental pressure vessel 18 is located in interior space 38a of containment structure 22a. Supplemental pressure vessel 18 is coupled in parallel to source line 14 by a "tee" connector 19 to be in fluid communication with both primary pressure vessels 12, 12a and fluid source 16. While two primary pressure vessels 12, 12a are illustrated, it is contemplated that other numbers of primary pressure vessels can also be used in a system as disclosed.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. A system including:
   a source of pressurized fluid;
   a primary pressure vessel disposed in fluid communication with the source, the primary pressure vessel having a first life expectancy duration and including a first structural characteristic; and
   a supplemental pressure vessel disposed in fluid communication with the source and in fluid communication with the primary pressure vessel, the supplemental pressure vessel having a second life expectancy duration shorter than the first life expectancy duration and including a second structural characteristic, wherein the supplemental pressure vessel is disposed in parallel with the primary pressure vessel with respect to the source.

2. The system of claim 1, and further comprising a containment structure configured to at least partially enclose the supplemental pressure vessel in an interior space therein.

3. The system of claim 2, and further comprising a sensor configured to detect a physical condition of the interior space that indicates failure of the supplemental pressure vessel.

4. The system of claim 3, and further comprising a controller in signal communication with the sensor.

5. The system of claim 4, and further comprising an indicator device in signal communication with the controller.

6. The system of claim 4 further comprising a valve disposed between the source and the primary pressure vessel, the valve being in signal communication with the controller.

7. The system of claim 1 wherein the second structural characteristic is a weakness configured such that the supplemental pressure vessel fails at the weakness.

8. The system of claim 1 wherein:
   the first structural characteristic is a first material; and
   the second structural characteristic is a second material that is different from the first material.

9. The system of claim 8 wherein:
   the first material is a carbon fiber composite; and
   the second material is an aramid fiber composite.

10. The system of claim 1 wherein the supplemental pressure vessel is smaller than the primary pressure vessel.

11. A method that uses a supplemental pressure vessel to predict impending failure of a primary pressure vessel, the method comprising:
    fluidly connecting a primary pressure vessel to a source of pressurized fluid;
    fluidly connecting a supplemental pressure vessel in fluid communication with the source and in fluid communication with the primary pressure vessel; and
    exposing the supplemental pressure vessel to a first fatigue load to cause its failure before failure of the primary pressure vessel occurs.

12. The method of claim 11, and further comprising:
    at least partially enclosing the supplemental pressure vessel in an interior space of a containment structure; and
    sensing a value of a physical condition of the interior space.

13. The method of claim 12, and further comprising:
    communicating the sensed value to a controller; and
    determining whether the failure of the supplemental pressure vessel has occurred as a function of the sensed value.

14. The method of claim 13, and further comprising relaying a signal from the controller to an indicator device to actuate the indicator device, thereby signaling the failure of the supplemental pressure vessel to a user.

15. The method of claim 13, and further comprising relaying a signal from the controller to a valve to stop fluid flow from the source to the primary pressure vessel.

16. The method of claim 11, further comprising exposing the primary pressure vessel to a second fatigue load that is lower than the first fatigue load.

* * * * *